United States Patent [19]
Georges et al.

[11] Patent Number: 6,087,451
[45] Date of Patent: Jul. 11, 2000

[54] PROCESS FOR PREPARING POLYMERS USING BIFUNCTIONAL FREE RADICAL REACTIVE COMPOUNDS

[75] Inventors: Michael K. Georges, Guelph, Canada; Toyofumi Inoue, Hiratsuka, Japan; Gordon K. Hamer, Mississauga, Canada; Peter M. Kazmaier, Mississauga, Canada; Richard P. N. Veregin, Mississauga, Canada

[73] Assignee: Xerox Corporation, Stamford, Conn.

[21] Appl. No.: 09/070,801

[22] Filed: May 1, 1998

Related U.S. Application Data

[62] Division of application No. 08/292,670, Aug. 18, 1994.
[51] Int. Cl.[7] .............................. C08F 293/00; C08F 4/32; C08F 4/04
[52] U.S. Cl. ....................... 525/259; 525/263; 525/265; 525/267; 525/273; 525/299
[58] Field of Search ..................................... 526/204, 220, 526/218.1, 232.1; 525/259, 263, 265, 267, 273

[56] References Cited

U.S. PATENT DOCUMENTS

| | | |
|---|---|---|
| 3,682,875 | 8/1972 | Sullivan et al. . |
| 3,879,360 | 4/1975 | Patron et al. . |
| 3,954,722 | 5/1976 | Echte et al. . |
| 4,201,848 | 5/1980 | Kotani et al. ........................... 525/314 |
| 4,207,266 | 6/1980 | Opie . |
| 4,340,708 | 7/1982 | Gruber . |
| 4,581,429 | 4/1986 | Solomon et al. ....................... 526/220 |
| 4,736,004 | 4/1988 | Scherer, Jr. et al. . |
| 4,777,230 | 10/1988 | Kamath . |
| 5,034,485 | 7/1991 | Tong et al. . |
| 5,051,511 | 9/1991 | Seltzer et al. . |
| 5,059,657 | 10/1991 | Druliner et al. . |
| 5,100,978 | 3/1992 | Hasenbein et al. . |
| 5,130,369 | 7/1992 | Hughes et al. .......................... 524/846 |
| 5,140,081 | 8/1992 | Seltzer et al. . |
| 5,145,893 | 9/1992 | Galbo et al. . |
| 5,173,551 | 12/1992 | Caneba ................................... 526/208 |
| 5,204,422 | 4/1993 | Seltzer et al. . |
| 5,216,096 | 6/1993 | Hattori et al. .......................... 526/201 |
| 5,247,021 | 9/1993 | Fujisawa et al. . |
| 5,247,023 | 9/1993 | Chung et al. . |
| 5,312,871 | 5/1994 | Mardare et al. ........................ 525/272 |
| 5,322,912 | 6/1994 | Georges et al. ........................ 526/204 |
| 5,401,804 | 3/1995 | Georges et al. ........................ 525/267 |
| 5,412,047 | 5/1995 | Georges et al. ........................ 526/204 |
| 5,449,724 | 9/1995 | Moffat et al. . |
| 5,498,679 | 3/1996 | Moffat et al. .......................... 526/204 |
| 5,627,248 | 5/1997 | Koster et al. ........................... 526/217 |

FOREIGN PATENT DOCUMENTS

| | | |
|---|---|---|
| 0 135 280 | 3/1985 | European Pat. Off. . |
| 0 349 270 B1 | 1/1990 | European Pat. Off. . |
| 478838 | 7/1975 | U.S.S.R. . |

OTHER PUBLICATIONS

W. Funke, "Progress in Organic Coatings," vol. 21, Nos. 2–3, pp. 227–254, Dec. 20, 1992.
Owen W. Webster, "Living Polymerization Methods," *Science*, vol. 251, pp. 887–893, Feb. 22, 1991.
Charles H. J. Johnson et al., "The Application of Supercomputers in Modelling Chemical Reaction Kinetics: Kinetic Simulation of 'Quasi–Living' Radical Polymerization," *Aust. J. Chem.*, vol. 43, pp. 1215–1230, 1990.
Ezio Rizzardo, ""Living Free" Radical Polymerisation," *Chemistry in Australia*, Jan.–Feb. 1987, p. 32.
E. J. Rauckman et al., "Improved Methods for the Oxidation of Secondary Amines to Nitroxides," *Synthetic Communications*, vol. 5, No. 6, pp. 409–413, 1975.
E. G. Rozantsev et al., Synthesis and Reactions of Stable Nitroxyl Radicals I. Synthesis, pp. 190–202, 1971.
E. G. Rozantsev et al., "The Synthesis of Individual Radicals," *Free Nitroxyl Radicals*, pp. 67–73.
Michiko Iwamura et al., "Novel Radical 1,3–Addition to Nitrones," *Short Communications*, vol. 40, No. 3, p. 702.
Hans–Georg Elias et al., *Macromolecules•2*, 2d. Ed., p. 719, Plenum Press, New York.
J. Kochi, *Free Radicals*, vol. I, pp. 16–24, 126–129, 278–281 and 290–293, Wiley, New York, 1973.
J. K. Kochi, *Free Radicals*, vol. II, pp. 88–89, 122–125, 132–135, 166–167 and 382, Wiley, New York, 1973.
D.C. Non Hekel et al., *Free–Radical Chemistry*, pp. 140–145, 196–203, 208–209, 212–213, 216–217 and 238–241, Cambridge, 1974.
E. Rizzardo et al., "A New Method for Investigating the Mechanism of Initiation of Radical Polymerization," *Polymer Bulletin*, vol. 1, pp. 529–534, 1979.
P. G. Griffiths et al., "Initiation Pathways in the Polymerization of Alkyl Methacrylates with tert–Butoxy Radicals," *J. Macromol. Sci.–Chem.*, A17(1), pp. 45–50, 1982.
G. Moad et al., "Selectivity of the Reaction of Free Radicals with Styrene," *Macromolecules*, vol. 15, pp. 909–914, 1982.
G. Moad et al., "The Reaction of Acyl Peroxides with 2,2,6,6–tetramethylpiperidinyl–1–oxy," *Tetrahedron Letters*, vol. 22, pp. 1165–1168, 1981.
G. Moad et al., "The Reaction of Benzoyloxy Radicals with Styrene—Implications Concerning the Structure of Polystyrene," *J. Macromol. Sci.–Chem.*, A17(1), pp. 51–59, 1982.
P. G. Griffiths et al., "Synthesis of the Radical Scavenger 1,1,3,3–tetramethylisoindolin–2–yloxyl," *Aust J. Chem.*, vol. 36, pp. 397–401, 1983.

(List continued on next page.)

*Primary Examiner*—Christopher Henderson
*Attorney, Agent, or Firm*—Oliff & Berridge, PLC

[57] ABSTRACT

A polymer having groups located at the ends of the polymer chain which groups are derived from stable free radical compounds, wherein the polymer is of the formula:

SFR-(R)-SFR wherein SFR represents a covalently bonded stable free radical group and R represents a thermoplastic resin.

2 Claims, 3 Drawing Sheets

OTHER PUBLICATIONS

G. Moad et al., "Reactions of Benzoyloxyl Radicals With Some Common Vinyl Monomers," *Makromol. Chem., Rapid Commun.,* vol. 3, pp. 533–536, 1982.

P. G. Griffiths et al., "Quantitative Studies on Free Radical Reactions With the Scavenger 1,1,3,3–tetramethylisoindolinyl–2–oxy," *Tetrahedron Letters,* vol. 23, No. 12, pp. 1309–1312, 1982.

E. Rizzardo et al., "Initiation Mechanisms in Radical Polymerizations: Reaction of Cumyloxy Radicals with Methyl Methacrylate and Styrene," *Aust. J. Chem.,* vol. 35, pp. 2013–2024, 1982.

M. J. Cuthbertson et al., "Head Addition of Radicals to Methyl Methacrylate," *Polymer Bulletin,* vol. 6, pp. 647–651, 1982.

G. Moad et al., "On the Regioselectivity of Free Radical Processes; Reactions of Benzoyloxy, Phenyl and t–Butoxy Radicals with Some α,β–Unsaturated Esters," *Aust. J. Chem.,* vol. 36, pp. 1573–1588, Aug. 1983.

A. V. Trubnikov et al., "Inhibition of Polymerization of Vinyl Monomers Using Nitride and Iminoxide Radicals," *Vysokomol. Soedin.,* Ser. A, vol. 20, No. 11, pp. 2448–2454, 1978.

E. G. Rozantsev et al., "Synthesis and Reactions of Stable Nitroxyl Radicals II. Reactions," *Synthesis,* vol. 8, pp. 401–414, Aug. 1971.

G. Moad et al., "A Product Study of the Nitroxide Inhibited Thermal Polymerization of Styrene," *Polymer Bulletin,* vol. 6, pp. 589–593, 1982.

R. D. Grant et al., "Solvent Effects on the Reaction of t–Butoxy Radicals with Methyl Methacrylate," *Aust. J. Chem.,* vol. 36, pp. 2447–2454, 1983.

S. Bottle et al., "The Mechanism of Initiation in the Free Radical Polymerization of N–Vinylcarbazole and N–Vinylpyrrolidone," *European Polymer J.,* vol. 25, pp. 671–676, 1989.

M. D. Gol'dfein et al., "Inhibition of Styrene Polymerization by the Stable Radical 4,4'–diethoxydiphenylnitroxide," *Vysokomol. Soedin.,* Ser. A, vol. 16, No. 3, pp. 672–676, 1974.

M. D. Gol'dfein et al., "Effect of Free Stable Radicals on the Kinetics and Mechanism of Polymerization of Some Vinyl Monomers," *Vysokomol. Soedin.,* Ser. A, vol. 17, No. 8, pp. 1671–1677, 1975.

A. V. Trubnikov et al., "Effect of Stable Radicals on Polymerization of Styrene," *Vysokomol. Soedin.,* Ser. B, vol. 18, No. 6, pp. 419–422, 1976.

A. V. Trubnikov et al., "Mechanism of Inhibition of Vinyl Monomer Polymerization by Stable Radicals," *Vysokomol. Soedin.,* Ser. B, vol. 18, No. 10, pp. 733–736, 1976.

J. Edgar Anderson et al., "Eclipsed Ground–State Conformations of the tert–Butyl–X Bond in N–tert–Butoxy– and N–Neopentyl–2,2,6,6–tetramethylpiperidine. X–ray Crystal Structure Determinations and Molecular Mechanics Calculations," *J. Am. Chem. Soc.,* 115, pp. 3494–3498, 1993.

George G. Odian, *Principles of Polymerization,* pp. 271–273, 1981.

W. Adam et al., "Trapping of Cyclopentanediyl and Trimethylenemethane Triplet Diradicals with the Nitroxide 1,1,3,3–Tetramethyl–1,3–dihydroisoindolin–2–yloxyl," *J. Org. Chem.,* vol. 57, pp. 982–988, 1992.

C.J. Hawker, "Molecular Weight Control by a "Living" Free–Radical Polymerization Process," *J. Am. Chem. Soc.,* vol. 116, pp. 11185–11186, 1994.

Li et al., "Synthesis, Characterization, and Evaluation of Initiators for Living Free Radical Polymerization: Synthesis of Polystyrene with Controlled Structure," *Polymer Preprints,* vol. 36, No. 1, pp. 469–470, Apr. 1995.

R.P.N. Veregin et al., "Mechanism of Living Free Radical Polymerizations with Narrow Polydispersity: Electron Spin Resonance and Kinetic Studies," *Macromolecules,* vol. 28, pp. 4391–4398, 1995.

G. M. Whitesides et al., "Reaction of n–Butyllithium and 2,2,6,6–Tetramethylpiperidine Nitroxyl," *J. Org. Chem.,* vol. 40, No. 23, pp. 3448–3450, 1975.

M. K. Georges et al., "Narrow Molecular Weight Resins by a Free–Radical Polymerization Process," *Macromolecules,* vol. 26, pp. 2987–2988, 1993.

C. J. Hawker, "Architectural Control in "Living" Free Radical Polymerizations: Preparation of Star and Graft Polymers," *Angew. Chem. Int. Ed. Engl.,* vol. 34, No. 13/14, pp. 1456–1459, 1995.

PROCESS FOR PREPARING POLYMERS USING BIFUNCTIONAL FREE RADICAL REACTIVE COMPOUNDS

CROSS REFERENCE TO COPENDING APPLICATIONS AND RELATED PATENTS

This is a Division of application Ser. No. 08/292,670 filed Aug. 18, 1994. The entire disclosure of the prior application (s) is hereby incorporated by reference herein in its entirety.

Attention is directed to commonly owned and assigned U.S. Pat. No. 5,322,912, issued Jun. 21, 1994, entitled "POLYMERIZATION PROCESSES AND THEIR TONER COMPOSITIONS THEREFROM", wherein there is illustrated a free radical polymerization process for the preparation of a thermoplastic resin or resins comprising, in embodiments, heating a mixture of a free radical initiator, a stable free radical agent, and at least one polymerizable monomer compound to form a thermoplastic resin or resins with a high monomer to polymer conversion; cooling the mixture; isolating the thermoplastic resin or resins; and washing and drying said thermoplastic resin or resins. In other embodiments there are disclosed processes for forming diblock, multiblock, monomodal, and multimodal thermoplastic resin products by variations in, for example, the order and or amounts of added reactants and free radical compounds. U.S. Pat. No. 5,312,704, issued May 17, 1994, entitled "MONOMODAL, MONODISPERSED TONER COMPOSITIONS AND IMAGING PROCESSES", wherein there is illustrated a toner composition comprised of pigment particles, and a resin comprised of a monomodal polymer resin or monomodal polymer resin blends and wherein the monomodal resin or resin blends possess a narrow polydispersity.

Also, attention is directed to commonly owned and assigned copending applications Application Numbers, U.S. Ser. No. 08/181,134 now U.S. Pat. No. 5,401,804 filed Jan. 4, 1994; U.S. Ser. No. 08/307,192 U.S. Pat. No. 5,852,140 filed Mar. 25, 1993; continuation-in-part of U.S. Pat. No. 5,332,912, filed Nov. 16, 1992, U.S. Ser. No. 08/214,518, filed Mar. 18, 1994, entitled "EMULSION POLYMERIZATION PROCESSES AND TONER COMPOSITIONS THEREFROM"; U.S. Ser. No. 08/223,418, filed Apr. 4, 1994, entitled "AQUEOUS POLYMERIZATION PROCESSES"; and U.S. Ser. No. 08/242,490, now U.S. Pat. No. 5,412,047 filed May 13, 1994, entitled "ACRYLATE POLYMERIZATIONS".

The disclosures of the above mentioned patents and copending applications are incorporated herein by reference in their entirety.

BACKGROUND OF THE INVENTION

The present invention relates to polymers, toner compositions, processes for the preparation of polymers, especially telechelic polymers, and more specifically to free radical polymerization processes which provide telechelic or bifunctionalized polymeric products having narrow polydispersity properties. In embodiments, the present invention relates to the utilization of free radical initiators together with free radical reactive monomer compounds and stable free radical agents, such as those illustrated in U.S. Pat. No. 5,332,912 the disclosure of which is totally incorporated herein by reference, to enable the preparation of bifunctional macromolecules which can be selected for crosslinking and permitting the formation of triblock and multiblock copolymers. More specifically in embodiments the present invention relates to providing novel narrow molecular weight pseudoliving homopolymers and copolymer resins that possess latent reactive sites at both ends thereof and wherein, for example, at elevated temperature the aforementioned resins can be reacted with other polymers having a free radical reactive site causing the modification thereof. This reaction can introduce crosslinking in the other polymer or polymers. The reaction of the bifunctional macromolecules with other monomers enables the formation of multiblock copolymers. The products obtained such as the multiblock copolymers can be selected as dispersants, viscosity modifiers, compatibilizers especially for toners with wax, and as polymers for toner compositions. The products obtained with the processes illustrated herein can in embodiments possess narrow polydispersities, that is, narrow molecular weight distributions as defined by the ratio $M_w:M_n$, wherein $M_w$ is the weight average molecular weight and $M_n$ is the number average molecular weight.

In other embodiments of the present invention are provided processes for the preparation of bifunctional pseudoliving polymeric compounds or bifunctional compounds derived from the addition of stable free radicals to the product resulting from the free radical addition of at least one monomer to a bifunctional free radical initiator compound; processes for further chemical elaboration and modification of the bifunctional polymer compounds; and processes for the chemical preparation and subsequent elaboration of the bifunctional polymer compounds and derivatives thereof. The polymeric bifunctional compounds of the present invention can be used to prepare, for example, triblock copolymers and multiblock polymer having narrow polydispersity properties and optionally wherein at least one of the blocks is water soluble and subsequently added blocks or segments may be only partially or entirely water insoluble thereby providing a means for preparing surface active or surfactant materials having well defined polydispersity and hydrophobe-lipophobe balance (HLB) properties.

Many known polymerization processes for the synthesis of narrow polydispersity resins, such as anionic, cationic and group transfer polymerization processes, are limited by the need for anhydrous reaction conditions and monomers which do not contain protic or reactive functional groups, for example, hydroxyl (OH), carboxyl ($CO_2H$), amino (NH), carbonyl (C=O), active methylene (—CH—C=O), and the like. As a consequence, these processes are not considered readily applicable to polymerizations in the presence of water or of water soluble monomers since these monomer materials tend to be hydroscopic and any associated water or reactive functional groups may readily destroy the polymerization initiator component, for example, the hydrolysis or protonation of organolithium reagents, or in other ways, cause the polymerization to fail entirely or to be industrially inefficient.

Conventional free radical polymerization processes that are used to polymerize monomers inherently give broad polydispersity resin products or require that sophisticated processing conditions and materials handling protocols be employed.

The polymer resins produced by processes of the present invention, in embodiments, are essentially monomodal, that is the molecular weight distribution is narrow and indicative of a Poisson character and without significant shoulders or side bands. In embodiments, by repeating the heating step, comprising the combined initiation and polymerization step, there is provided a means for obtaining monomodal mixtures of bifunctional polymer resins that are compositionally the same resin type having characteristics of both narrow polydispersity and known or selectable modality greater than or equal to 1. In embodiments, processes of the present invention provide a means for conducting free radical polymerization processes which provide bifunctional resin products on multi kilogram or larger scales. The aforementioned embodiments may be accomplished in a one or single pot reactor environment. In embodiments, polymeric chain growth proceeds by a pseudoliving mechanism and can provide resins of variable molecular weights from very low to very high, for example, less than about 2,000 up to about 200,000 while maintaining narrow molecular weight distributions or polydispersities. In embodiments, triblock and multiblock copolymers can be synthesized by the aforementioned stable free radical moderated polymerization processes wherein each block formed is well defined in length by the sequentially added and reacted monomer and wherein each additional block that is formed also possesses a narrow molecular weight distribution.

It is generally accepted that known anionic and cationic polymerization processes used for the preparation of narrow polydispersity resins, homopolymers, block and multiblock polymers, are not believed possible in aqueous or protic solvent containing polymerization media, reference the aforementioned number U.S. Pat. No. 5,312,704, issued May 17, 1994. The present invention enables the preparation of bifunctional homopolymeric, copolymeric, terpolymeric, block, triblock, and multiblock copolymers which preparation was heretofore not believed effectively possible using free radical polymerization systems.

Of the known polymerization processes a preferred way to prepare polymers or copolymers having a narrow molecular weight distribution or polydispersity is by anionic processes. The use and availability of resins having narrow polydispersities in industrial applications is limited because anionic polymerization processes must be performed in the absence of atmospheric oxygen and moisture, require difficult to handle and hazardous initiator reagents, and consequently such polymerization processes are generally limited to small batch reactors. In addition, the monomers and solvents that are used must be of high purity and anhydrous thereby rendering the anionic process more expensive than alternatives which do not have these requirements. Thus, anionic polymerization processes are difficult and costly. It is desirable to have free radical polymerization processes that provides block and multiblock resins additionally containing bifunctionality that is derived from the addition of stable free radical compounds to the ends of free radical propagating polymer chains and with narrow molecular weight distributions that overcome the shortcomings and disadvantages of the aforementioned anionic polymerization processes.

Free radical polymerization processes are generally chemically less sensitive than anionic processes to impurities in the monomers, reactive functional groups in the monomer, or solvents typically used and are completely insensitive to water.

Polymerization processes are known in the art which proceed by a free radical mechanism providing resins of broad polydispersities and generally high molecular weights. The present invention relates to polymerization processes that proceeds via a pseudoliving free radical mechanism and provide resins of high, intermediate, or low molecular weights, which molecular weight ranges are conveniently determined and controlled by an operator, and which resins possess narrow polydispersities.

The present invention provides product resins with a thermally latent reactive functional group on both ends of the polymer, and which latent functionality can be selectively used in further reactions to prepare other resins with complex architectures. The present invention, in embodiments, provides for polymerization processes that enable control of resin molecular weight, molecular weight distribution, modality of the products, intra-chain monomer composition, and the like properties.

Free radical polymerization processes are industrially important, and are used for the synthesis of numerous copolymers, for example, deflocculating or dispersant polymers. However, resins prepared by free radical polymerization processes typically have broad polydispersities and high molecular weights. When low molecular weight resins are required, a chain transfer agent is typically added to limit the extent of chain growth by way of premature chain termination events and which agent is, for example, an unpleasant smelling thiol. Polymers prepared by thiol type chain transfer polymerization processes are typically irreversibly terminated at either chain end with a functional group, such as alkyl thiol, which precludes further free radical reactions and therefore limits the utility of the polymer resin products produced therefrom.

Copolymers prepared by conventional free radical polymerization processes inherently have broad molecular weight distributions or polydispersities, generally greater than about four. One reason is that most free radical initiators selected have half lives that are relatively long at the temperatures at which the polymerizations are carried out, for example, from several minutes to many hours, and thus the polymeric chains are not all initiated at the same time and which initiators provide growing chains of various lengths at any time during the polymerization process. Another reason is that the propagating chains in a free radical process can react with each other in processes known as coupling and disproportionation, both of which are chain terminating and polydispersity broadening reactions. In doing so, chains of varying lengths are terminated at different times during the reaction process which results in resins comprised of polymeric chains which vary widely in length from very small to very large and thus have broad polydispersities. In the present invention free radical polymerization processes are enabled for producing narrow molecular weight distributions, wherein all polymer chains are initiated at about the same time and premature chain termination by coupling or disproportionation processes is substantially reduced.

Contemporary environmental issues and pollution concerns are prompting greater use of certain biodegradable polymers, among these are water soluble polymers as described by F. Lo, J. Petchonka, J. Hanly, *Chem. Eng. Prog.*, July, 1993, p. 55–58, the disclosure of which is incorporated by reference herein in its entirety. The present invention provides, in embodiments, processes for preparation of various biodegradable and water soluble polymers.

In other applications, such as water treatment, it is particularly important that polymer products have a narrow molecular weight distribution, that is, low polydispersity. In conventional free radical polymerization processes polydispersity rises rapidly as the high molecular weight fraction of the polymer mixture increases. In many processes designed to produce low molecular weight polymers, high molecular weight fractions are observed because there is insufficient control over chain-chain coupling and branching. These high molecular weight fractions tend to dominate the viscosity characteristics of the polymer product and can detract from polymer performance. Other processes designed to produce low molecular weight polymers result in the formation of excessive amounts of oligomeric products, for example, dimers and trimers, which can also detract from the polymer performance. These oligomeric byproducts do not have as much of an affect on the viscosity characteristics of the polymer mixture. However, the oligomers affect the number average molecular weight such that the average is no longer indicative of the properties of the polymer product.

In addition to chain-chain coupling and branching, processes for producing low molecular weight polymer products tend to have high polydispersities resulting from the methods used to reduce the residual monomer content of the polymer product. Methods of reducing the residual monomer content of the polymer mixture include post polymerization processing which employs additional initiator, extended periods at elevated temperatures, and use of comonomeric scavengers. These methods tend to broaden the molecular weight distribution or polydispersity. Therefore, unless the polymer mixture has a sufficiently low polydispersity to begin with, the above mentioned methods used to reduce residual monomer content will raise polydispersity of the product to an unacceptable level.

In the aforementioned U.S. Pat. No. 5,322,912, there is disclosed free radical polymerization processes for the preparation of a thermoplastic resin or resins comprising: heating from about 100 to about 160° C. a mixture comprised of a free radical initiator, a stable free radical agent, and at least one polymerizable monomer compound to form the thermoplastic resin or resins with a high monomer to polymer conversion and a narrow polydispersity.

The following patents are of interest to the background of the present invention, the disclosures of which are incorporated by reference herein in their entirety:

In U.S. Pat. No. 5,247,023, to Chung et al., issued Sep. 23, 1993, disclosed is a polymer compound having boron atoms located at the ends of polymer chain or in the polymer backbone, wherein the boron containing polymer has a formula consisting of:

$R_1R_2B$—$(CH_2)_n$—$CH$=$CH$---[Hydrocarbon Polymer]---
$CH$=$CH$—$(CH_2)_m$—$BR_1R_2$ $\{$---[Hydrocarbon Polymer]---$CH$=$CH$—$(CH_2)_n$$]_m$—$BR_{3-m}$---$\}_x$ or combinations thereof wherein n is an integer range from 0 to 12, m is 2 or 3, $R_1$ and $R_2$ are the same or different alkyl or cycloalkyl radicals having from 1 to 10 carbon atoms and R is the alkyl or cycloalkyl radicals having from 1 to 10 carbon atoms. Polymeric hydrocarbons having reactive borane group at chain ends or in the polymer chain are described. These types of polymers can be used as intermediate materials for preparing a broad range of polymers which have functional groups located at both ends of the polymer chain, hereinafter alternatively referred to as telechelic polymers. The process of preparing the borane-containing polymers involves metathesis degradation of the polymer at the double bond location in the back bone and simultaneous functionalization of the broken chain ends by borane monomers. Depending on the nature of the borane monomer, the location of boron atoms can be controlled to be at either the chain ends (telechelic) or in the polymer back bone. The concentration of boron in the resulting polymer is related to the reaction time and the mole ratio between borane monomer and the double bonds in the starting hydrocarbon polymer. In turn, the borane groups are interconvertible to various functional groups, such as OH, $NH_2$, and halides, under mild reaction conditions. Overall, the chemistry is very general and is applicable to most hydrocarbon polymers. A wide variety of telechelic polymers are obtained.

As indicated in the background of the invention section of the aforementioned '023 patent, living polymers are particularly preferred for the preparation of telechelic polymeric materials, that is polymers with functional groups at both chain ends, because these routes provide well defined polymers with a high degree of functional groups at both ends of the polymer chain. However, this process was heretofore previously very limited because only very few monomers undergo living propagation, that is, the aforementioned monomers do not contain reactive functional groups and are not hydroscopic.

In U.S. Pat. No. 5,247,021, to Fujisawa et al., issued Sep. 23, 1993, is disclosed a process for preparing an isobutylene-type allyl-terminated polymer, the process comprising combining: a) a cationically polymerizable isobutylene-containing monomer; b) an organic compound serving as an initiator and concurrently as a chain transfer agent, the organic compound being represented by the formula $CR_1R_2R_3X$ wherein X is a halogen atom, a RCOO-group (wherein R is a monovalent organic group, the same hereinafter) or a RO-group, $R_3$ is a polyvalent aromatic ring group or a substituted or unsubstituted polyvalent aliphatic hydrocarbon group, and $R_1$ and $R_2$ are the same or different and each represent a hydrogen atom or a substituted or unsubstituted monovalent hydrocarbon group, provided that when $R_3$ is a polyvalent aliphatic hydrocarbon group, $R_1$ and $R_2$ can not be concurrently a hydrogen atom; c) a Lewis acid selected form the group consisting of $SnCl_4$ and $TiCl_4$; and d) a compound serving as an end capping agent agent, the compound being represented by the formula $CH_2$=$CHCH_2SiR_4R_5R_6$ wherein $R_4$, $R_5$ and $R_6$ are the same or different, and each represent a monovalent organic group or a monovalent organic group containing 1 to 3 silicon atoms, whereby the cationically polymerizable monomer is polymerized at −40 to 10° C.

U.S. Pat. No. 4,581,429 to Solomon et al., issued Apr. 8, 1986, discloses a free radical polymerization process which controls the growth of polymer chains to produce short chain or oligomeric homopolymers and copolymers including block and graft copolymers. The process employs an initiator having the formula (in part) =N—O—X, where X is a free radical species capable of polymerizing unsaturated monomers. The molecular weights of the polymer products obtained are generally from about 2,500 to 7,000 having polydispersities generally of about 1.4 to 1.8, at low monomer to polymer conversion. The reactions typically have low conversion rates and use relatively low reaction temperatures, of less than about 100° C., and use multiple stages.

U.S. Pat. No. 5,059,657 to Druliner et al., issued Oct. 22, 1991, discloses a polymerization process for acrylic and maleimide monomers by contacting the monomers with a diazotate, cyanate or hyponitrite, and N-chlorosuccinimide, N-bromosuccinimide or a diazonium salt. The polymer produced can initiate further polymerization, including use in block copolymer formation.

Other references cited in an international search report for the aforementioned U.S. Pat. No. 5,322,912 are: *J. Am. Chem. Soc.*, 1983, 5706–5708; *Macromol.*, 1987, 1473–1488; *Macromol.*, 1991, 6572–6577; U.S. Pat. No. 4,628,019 to Suematsu et al., issued Aug. 10, 1986; U.S. Pat. No. 3,947,078 to Crystal, issued Aug. 10, 1976; and U.S. Pat. No. 3,965,021 to Clemens et al., issued Jun. 22, 1976.

The following references may also of interest: U.S. Pat. Nos. 3,682,875; 3,879,360; 3,954,722; 4,201,848; 4,542, 182; 4,581,429; 4,777,230; 5,059,657; 5,173,551; 5,191,008; 5,191,009; 5,194,496; 5,216,096; and 5,247,024.

In free polymerization reaction processes of the prior art, various significant problems exist, for example difficulties in predicting or controlling both the polydispersity and modality of the polymers produced. These polymerization processes produce polymers with high weight average molecular weights ($M_w$) and low number average molecular weights ($M_n$) resulting in broad polydispersities or low molecular weight ($M_n$) and in some instances low conversion. Further, free radical polymerization processes of the prior art are prone to generating excessive quantities of heat since the polymerization reaction is exothermic. As the viscosity of the reaction medium increases dissipation of heat becomes more difficult. This is referred to as the Trommsdorff effect as discussed and illustrated in *Principles of Polymerization,* G. Odian, 2nd Ed., Wiley-Interscience, N.Y., 1981, page 272. This is particularly the situation for reactions with high concentrations of monomer, for example greater than 30 to 50 percent by weight of monomer, which are conducted in large scale reactors with limited surface area and limited heat dissipation capacity. Moreover, the exothermic nature of free radical polymerization processes is often a limitation that severely restricts the concentration of reactants or the reactor size upon scale up.

Further, gel body formation in conventional free radical polymerization processes may result in a broad molecular weight distributions and/or difficulties encountered during filtering, drying and manipulating the product resin, particularly for highly concentrated reactions.

These and other disadvantages are avoided, or minimized with the free radical polymerization processes of the present invention.

Thus, there remains a need for polymerization processes for the preparation of narrow polydispersity telechelic or end group bifunctionalized polymeric resins by economical and scalable free radical polymerization techniques and which polymers retain many or all of their desirable physical properties, for example, hardness, low gel content, processability, clarity, high gloss durability, and the like, while avoiding the problems of gel formation, exotherms, volume limited and multi-stage reaction systems, purification, low yields, limited selection of the starting monomers, performance properties of the polymer resin products, and the like, associated with prior art free radical polymerization methodologies.

The free radical polymerization processes and the resulting telechelic thermoplastic resin products of the present invention are useful in many applications, for example, as a variety of specialty applications including toner and liquid immersion development ink resins used for electrophotographic imaging processes or where monomodal or mixtures of monomodal narrow molecular weight resins or block copolymers with a narrow molecular weight distribution within each block component are suitable for use, for example, in thermoplastic films and solvent borne coating technologies, and for derivatization or modification of other polymeric materials by, for example, crosslinking or grafting reactions.

There remains a need for an economical free radical polymerization process for the preparation of free radical reactive and thermally labile bifunctional or telechelic thermoplastic resins containing or incorporating stable free radical bifunctional groups and which resins possess narrow polydispersities.

There also remains a need for inexpensive, efficient and environmentally sound ways to produce polymers and in particular specifically functionalized polymers having operator controllable or selectable molecular weight properties, and further, processes which selectively afford a wide variety of different polymer product types with narrow molecular weight distribution properties.

The present invention provides pseudoliving free radical polymerization processes which permit the economic preparation of narrow polydispersity resins with low, intermediate, or high molecular weights. The low molecular weight resins can be prepared without a chain transfer agent or molecular weight modifier which thereby provides several advantages over conventional chain transfer mediated polymerization processes.

SUMMARY OF THE INVENTION

An object of the present invention is to provide polymerization processes for the preparation of telechelic polymers, and telechelic polymers therefrom that overcome several of the problems and disadvantages of the aforementioned prior art.

In another object of the present invention is provided direct methods, for example single pot processes, for the preparation of telechelic polymeric resins of the formula: SFR-(R)-SFR wherein SFR represents a functional group derived from a stable free radical group and R represents a homopolymer or copolymer thermoplastic resin.

In another object of the present invention is provided, in embodiments, processes for polymerizing a broad spectrum of free radical reactive monomers by heating a free radical initiator, a stable free radical agent, a bifunctional free radical reactive compound, to form an intermediate bifunctional stable free radical adduct compound of the formula: SFR-(I-B-I)-SFR wherein B represents the bifunctional nucleus free radical reactive compound, I represents free radical initiator fragments and are bonded to the B nucleus, but not to the SFR group, and SFR represents the stable free radical agent functional groups; followed by heating the adduct with at least one polymerizable monomer compound, and optionally one or more solvents, to form a telechelic resin or resins of the formula SFR-(R)-SFR wherein SFR represents the stable free radical group and R represents a homopolymer or copolymer thermoplastic resin with a high monomer to polymer conversion and narrow polydispersity properties.

It is also an object of the present invention to provide polymerization processes for the production of triblock telechelic polymers of the formula $SFR-(R^1)-(R)-(R^1)-SFR$ wherein $R^1$ represents the polymeric blocks or segments resulting from the polymerization and incorporation of the additional monomer at either end of the polymer compound in approximately equal amounts with high monomer to polymer conversion and a narrow polydispersity.

It is also an object of the present invention to provide polymerization processes for the production of multiblock telechelic polymers of the formula $SFR-(R^N)(R^1)-(R)-(R^1)(R^N)-SFR$ wherein $R^N$ represents the polymeric blocks or segments resulting from continued polymerization and incorporation of the additional monomer at both end of the polymer compound in approximately equal amounts with high monomer to polymer conversion and a narrow polydispersity.

Another object of the present invention provides a polymerization process for the preparation of bifunctional or telechelic polymer compounds comprising heating a mixture comprised of a bifunctional free radical initiator, a stable free radical agent, and at least one free radical reactive monomer compound, to form the bifunctional thermoplastic resin or resins of the formula SFR-(R)-SFR wherein SFR represents covalently bonded thermally labile stable free radical groups and R represents a homopolymer or copolymer thermoplastic resin with a high monomer to polymer conversion and a narrow polydispersity.

In yet another object of the present invention is provided a process for heating the aforementioned bifunctional polymer compound of the formula SFR-(R)-SFR with at least one additional free radical reactive monomer to form a bifunctional triblock thermoplastic resin of the formula $$SFR-(R^1)-(R)-(R^1)-SFR$$

wherein $R^1$ represents the polymeric blocks or segments resulting from the polymerization and incorporation of the additional monomer at the ends, that is between the existing resin R and the -SFR groups, of the polymer compound in approximately equal amounts.

Still in another object of the present invention is provided a process for sequentially heating the aforementioned bifunctional triblock copolymer of the formula SFR-($R^1$)-(R)-($R^1$)-SFR in the presence of additional monomer N times, wherein the additional monomer is a different monomer from the monomer added immediately preceding addition of said additional monomer and wherein a bifunctional multiblock copolymer resin of the formula SFR-($R^N$)($R^1$)-(R)-($R^1$)($R^N$)-SFR results wherein $R^N$ represents the polymeric blocks or segments resulting from continued polymerization and incorporation of additional monomer having 2N+3 blocks, where N is a number representing the number of times that additional monomer is sequentially added to the triblock copolymer or subsequent product and wherein the multiplier value of 2 indicates that the additional monomer is incorporated in about equal amounts at both ends of the copolymer chain between the existing resin and the -SFR groups.

It is a further object of the present invention to provide pseudoliving free radical polymerization processes which do not require the use of time dependent and controlled monomer addition, for example, starve feed addition processes, solubility equilibrium driven processes, or chain transfer agents as a means of controlling the molecular weight of the resulting polymers.

Another object of this invention is to provide free radical polymerization processes which result in telechelic polymeric resin products having number average molecular weights above 1,000.

Another object of this invention is to provide bifunctional polymer mixtures having number average molecular weights above about 1,000 to about 200,000 and a polydispersity from about 1.0 to about 2.0.

Another object of this invention is to provide a polymer or polymer blends having sufficiently low polydispersity properties and high monomer conversions such that residual monomer levels are low and are within industrially acceptable levels.

Another object of the present invention is to provide a polymerization reaction system which affords narrow polydispersity homopolymeric or copolymeric bifunctional thermoplastic resin products in high yield and with minimal or no objectionable byproducts.

Another object of the present invention is to provide a polymerization reaction system which may be conducted in the presence of a minimum amount of conventional reaction media such as water, organic solvents and mixtures of water and water miscible organic solvents.

In yet another object of the present invention, coupling or disproportionation termination reactions are minimized by reversibly terminating the propagating free radical chains with a stable free radical agent which serves to moderate the exothermicity and modality properties of the polymerization process.

In another object of the present invention is provided the acceleration of the dissociation of the free radical initiator by the addition of promoter compounds which include, for example, tertiary amines, which ensure that all polymeric chains are initiated nearly simultaneously or at about the same time.

In another object of the present invention is the addition of small amounts of organic acids, for example, sulfonic or carboxylic acids, to the reaction medium to increase the rate of monomer reaction without broadening the polydispersity of the polymeric resins and without inducing autopolymerization effects.

Still another object of the present invention is to prepare telechelic thermoplastic resins by single pot processes employing suitable free radical reactive monomer or monomers, free radical initiator, bifunctional nucleus free radical reactive compound, optional minimal amounts of an emulsifier or surfactant which may simplify isolation, but avoids emulsification or phase separation during the polymerization, and a stable free radical agent.

Another object of the present invention is to prepare telechelic resins using polymerization processes wherein the molecular weight of the growing polymer or copolymer chains increase over the entire time period of the polymerization reaction and wherein the percent conversion or degree of polymerization of monomer to polymer with respect to time or number average molecular weight is approximately linear, that is, polymerization processes which occur without the aforementioned Trommsdorff effect.

Still another object of the present invention is to provide polymerization processes for the preparation of resins with narrow polydispersity properties and which polymerization processes are accomplished in a time efficient and economic manner by the optional addition of minor amounts of inorganic acid, organic acid, and amine promoter compounds.

Other objects of this invention will be apparent to those skilled in the art in light of the present disclosure and appended claims.

DETAILED DESCRIPTION OF THE INVENTION

The present invention provides polymerization processes for preparing bifunctional polymeric resins with well defined molecular weight properties and narrow polydispersities. The processes can be run as batch, semi-continuous or continuous processes. The processes provide for from about 0 to about 99 percent by weight of the reaction mixture to be water, nonaqueous solvent, or water-cosolvent mixtures and the processes are conducted at from about 100° C. to about 180° C. The processes produce polymer products having low, intermediate, or high molecular weight, narrow polydispersity, and low residual salt content or are salt free.

In embodiments, the present invention overcomes the problems and disadvantages of the prior art polymerization processes by, for example, forming narrow polydispersity polymeric resins by means of, for example, a polymerization process comprising heating a mixture comprised of monomer a free radical initiator, a stable free radical agent, a bifunctional initiator which yields two free radical sites in the same molecule upon homolytic dissociation and subsequently heating the resulting mixture with at least one polymerizable monomer compound, to form a telechelic thermoplastic resin or resins with a high monomer to polymer conversion and a narrow polydispersity. The above reaction and product can be accomplished in an analogeous fashion using instead a monofunctional free radical initiator and a bifunctional reative monomer. As used herein, the term "telechelic" refers to, for example, oligomers and, in the case of the present invention, polymers with known functional end groups, reference, for example, Hans-Georg Elias in *Macromolecules*, Vol. I, Plenum Press, NY.

Figure 1:
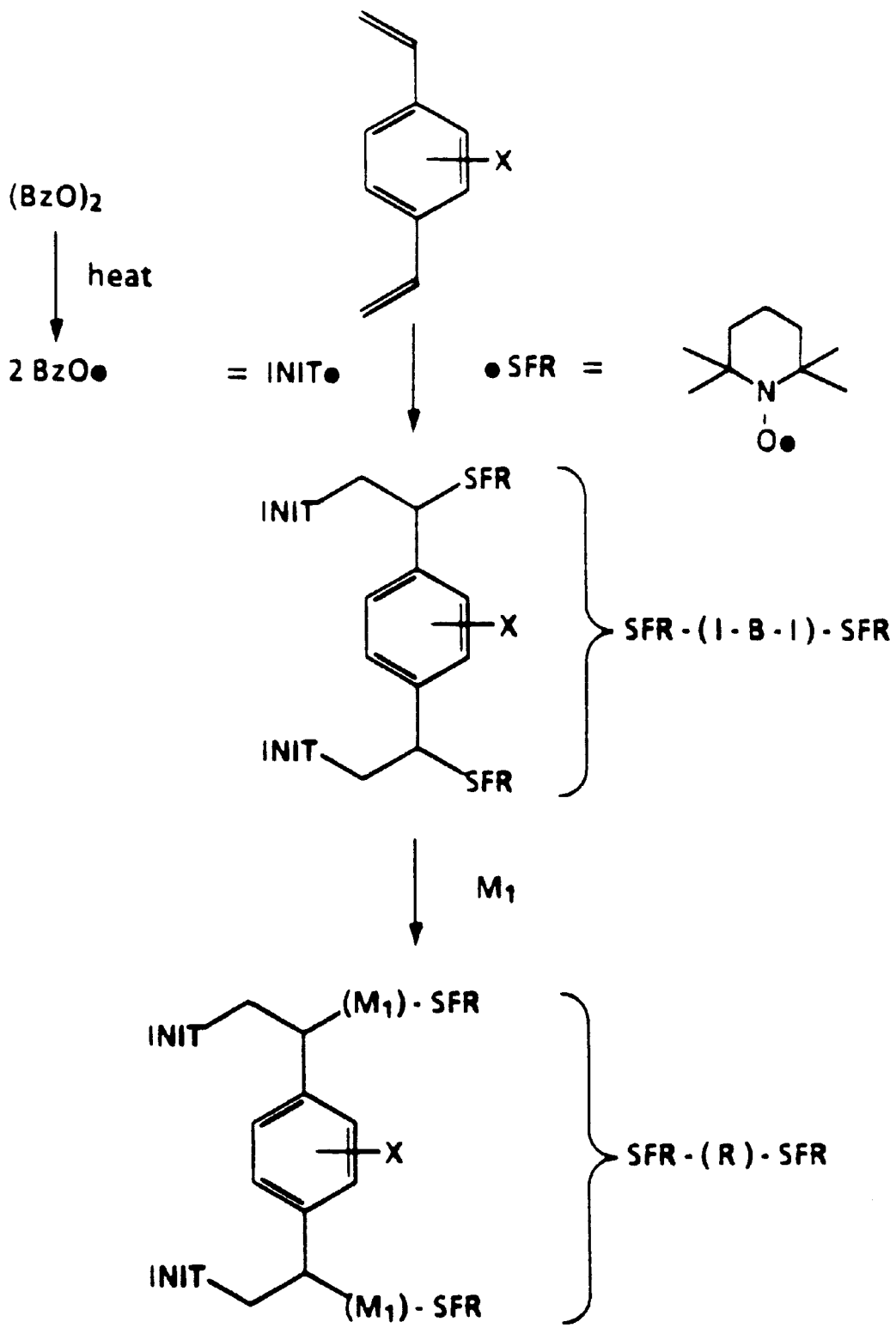
FIG. 1 is a reaction scheme representing an illustrative and exemplary synthesis of bifunctional stable free radical polymeric resins or telechelic thermoplastic resins of the present invention.
Figure 2:
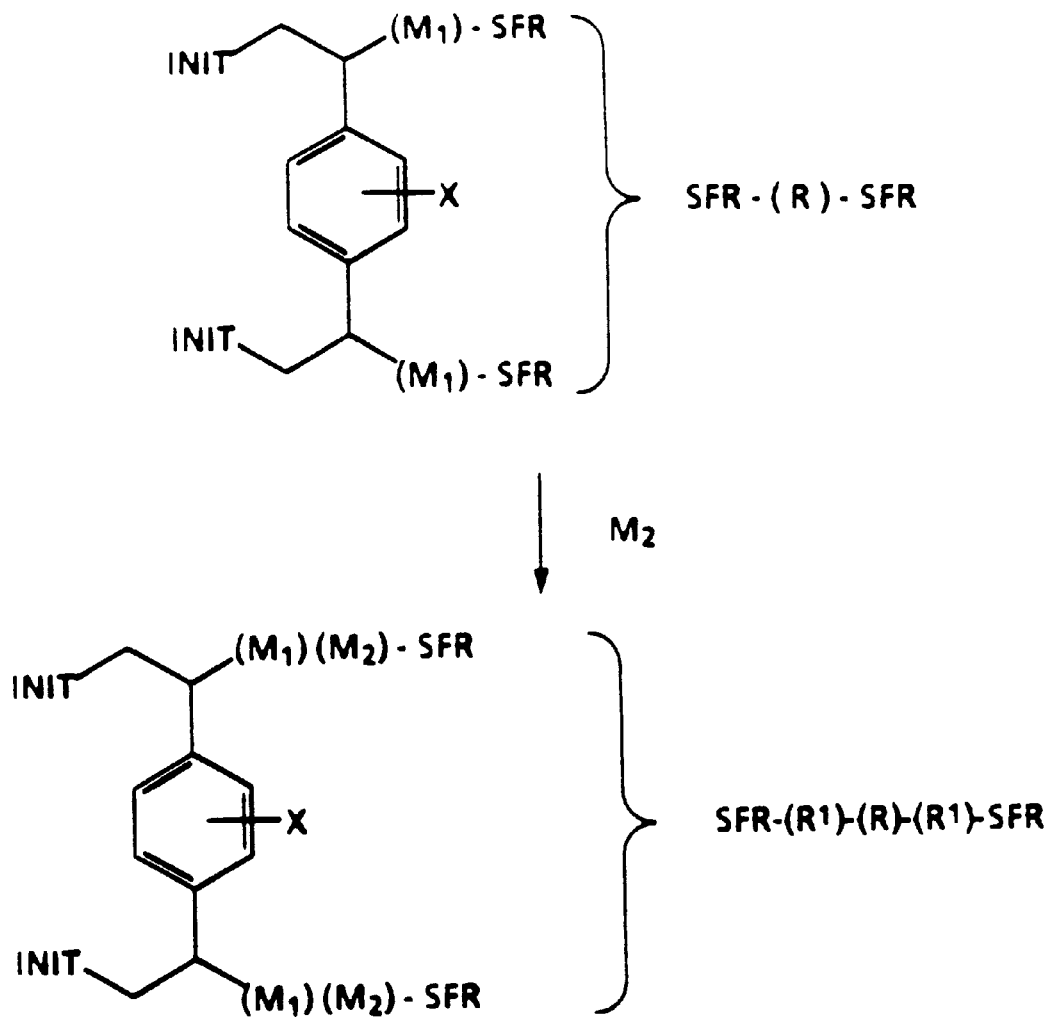
FIG. 2 is a reaction scheme representing an illustrative and exemplary further elaboration, by stable free radical mediated means, of a bifunctional stable free radical polymeric resin or telechelic block thermoplastic resin of the present invention into a telechelic triblock thermoplastic resin.
Figure 3:
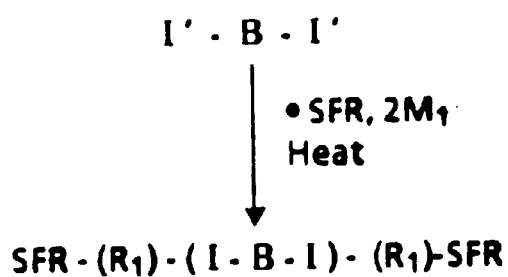
FIG. 3 is a reaction scheme representing an illustrative and exemplary synthesis and further elaboration, by stable free radical mediated means, of bifunctional stable free radical polymeric resins or telechelic thermoplastic resins of the present invention.
Figure 4:
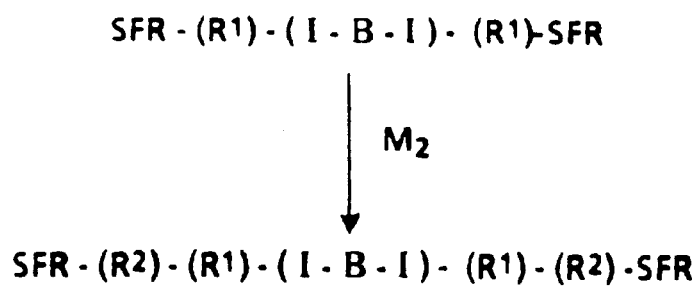
FIG. 4 is a reaction scheme representing an illustrative further elaboration of bifunctional stable free radical terminated polymeric resins or telechelic thermoplastic resins with additional monomer ($M_2$) to form a tetrablock copolymer with I-B-I spacer.

In embodiments, the present invention provides for a telechelic polymer compound having stable free radical groups located at the ends of the polymer chain, wherein the stable free radical containing compound is of the formula:

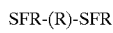

wherein SFR represents a stable free radical group and R represents a homopolymer or copolymer thermoplastic resin. The telechelic or bifunctional polymer compounds of the present invention are provided by polymerization processes comprising heating a mixture comprised of a free radical initiator, a stable free radical agent, a bifunctional free radical initiator, and at least one monomer compound to form a bifunctional stable free radical adduct compound of the formula:

wherein I-B-I represents the bifunctional free radical initiator compound or fragment, M represents the added monomer, and SFR represents the aforementioned stable free radical agent functional groups; and adding and heating at least one polymerizable monomer compound to form the bifunctional thermoplastic resin or resins of the formula SFR-(R)-SFR wherein SFR represents a stable free radical group and R represents a homopolymer or copolymer thermoplastic resin with a high monomer to polymer conversion and a narrow polydispersity. The bifunctional compound can contain a variety of free radical unreactive or insensitive functional groups, reference the aromatic substituent labeled X in FIGS. 1 and 2, such as alkyl, aromatic, ester, ether, and the like substituents.

The foregoing process can, in embodiments, be expanded to enable the formation of bimodal or multimodal thermoplastic resins by for example, adding to the aforementioned bifunctional thermoplastic resin a second mixture comprised of a free radical initiator, a stable free radical agent, and at least one polymerizable monomer compound, wherein the polymerizable monomer compound of the second mixture contains the same or different monomer components from the polymerizable monomer compound from the original monomer mixture, and the free radical initiator and the stable free radical agent of the second mixture are the same or different from the free radical initiator and the stable free radical agent of the first mixture, and wherein there is formed a combined mixture; heating the combined mixture to form a third mixture comprised of a mixture of thermoplastic resins comprised of a triblock product resin formed from the first bifunctional thermoplastic resin and added the second monomer, and a second product resin formed exclusively from the second monomer; cooling the third mixture; optionally isolating the mixture of thermoplastic product resins from the third mixture, wherein the first product resin and the second product resin each possess a narrow polydispersity. The resulting mixture of thermoplastic resins possesses a modality of 2. Higher modalities, for example, of from 3 to about 20 can be conveniently achieved, if desired, by the subsequent addition of additional fresh mixtures of monomer, free radical initiator, and stable free radical agent prior to a final cooling and isolation step.

In other embodiments of the present invention, there are provided polymerization processes for the preparation of monomodal bifunctional triblock thermoplastic resins comprising: heating the polymer compound of the formula SFR-(R)-SFR with at least one additional and different monomer in the absence of additional free radical initiator or stable free radical agent to form a bifunctional triblock thermoplastic resin of the formula

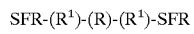

wherein $R^1$ represents the polymeric blocks or segments resulting from the polymerization and incorporation of the additional monomer at the ends of the polymer compound in approximately equal amounts.

The aforementioned polymerization can be repeated with the same monomer to provide chain extension of the starting polymer.

In still other embodiments of the present invention, there are provided polymerization processes for the preparation of monomodal bifunctional multiblock copolymer thermoplastic resin comprising: sequentially heating the triblock copolymer of the formula SFR-($R^1$)-(R)-($R^1$)-SFR in the presence of additional monomer N times, wherein the additional monomer is a different monomer from the monomer added immediately preceding addition of said additional monomer and wherein a multiblock copolymer resin of the formula SFR-($R^N$)($R^1$)-(R)-($R^1$)($R^N$)-SFR results wherein $R^N$ represents the polymeric blocks or segments resulting from continued polymerization and incorporation of additional monomer having 2N+3 blocks, where N is a number representing the number of times that additional monomer is sequentially added to the initial triblock copolymer or subsequent product and wherein the multiplier value of 2 indicates that the additional monomer is incorporated in about equal amounts at both ends of the copolymer chain.

Effective selection of the water solubility properties of added monomers and the resulting polymeric segment(s) enables convenient synthetic routes to block and multiblock copolymers with narrow polydispersities that are useful, for example, as surfactants and emulsifiers.

In embodiments, the telechelic compounds of the present invention can be prepared with bifunctional initiator compounds such as LUPERSOL 2531 (available from Wallace and Tiernam Co. or Polyvel Corporation) of the formula

Figure 5:
FIG. 5 is a reaction scheme representing an illustrative alternative route to telechelic polymers of the present invention wherein a bifunctional free radical initiator compound precursor I reacts with at least two equivalents of a monomer ($M_1$) and at least two equivalents of a stable free radical compound to form a bifunctional stable free radical-monomer-initiator adduct.

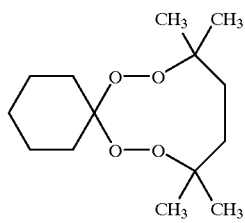

which bifunctional initiator compounds are cyclic bis peroxides or azo initiators since they must open upon degradation to give only or preferably bifunctional free radical sites on the resulting fragment or fragments. An exemplary reaction-scheme utilizing a bifunction free radical initiator is shown in FIG. 5, wherein it is believed the bifunctional initiator compound (I) yields the bifunctional free radical (•I•) upon thermal or irradiative degradation which readily reacts with equivalent amounts of available monomer ($M^1$) and stable free radical compound (SFR•), respectively, to presumably form the unisolated adduct of the formula SFR-($M^1$-I-$M^1$)-SFR, which simultaneously, or stepwise if desire, reacts with additional second monomer ($M^2$) to form SFR-($M^2_n$-$M^1_m$-I-$M^1_m$-$M^2_n$)-SFR wherein $M^1$ and $M^2$ may be the same or different and m and n are intergers representing the number of monomers added and is from 1 to about 1,000.

The bifunctional nucleus free radical reactive compound (B) is selected from the group consisting of divinyl benzene, disopropenyl benzene, 1,4-pentadiene, N,N'-methylenebisacrylamide, ethylene glycol dimethacrylate, diethylene glycol dimethacrylate, triethylene glycol dimethacrylate, polyethylene glycol dimethacrylate, divinyl ether, bisphenol A dimethacrylate, bisoxyethylenated bisphenol A diacrylate, and the like, and provides an initiation nucleus or node when reacted with at least two equivalents of both a monofunctional free radical initiator compound and a stable free radical agent. The resulting intermediate product SFR-(I-B-I)-SFR is thermally quite stable below about 75 to 100° C. and may be readily isolated or directly converted to product resin in situ.

One class of free radical reactive carboxylic acid monomers suitable for use in the present invention are $C_3$–$C_6$ monoethylenically unsaturated monocarboxylic acids, and the alkali metal and ammonium salts thereof. The $C_3$–$C_6$ monoethylenically unsaturated monocarboxylic acids include acrylic acid, methacrylic acid, crotonic acid, vinylacetic acid, and acryloxypropionic acid. Acrylic acid and methacrylic acid are preferred monoethylenically unsaturated monocarboxylic acid monomers.

Another class of carboxylic acid monomers suitable for the present invention are $C_4$–$C_6$ monoethylenically unsaturated dicarboxylic acids and the alkali metal and ammonium salts thereof, and the anhydrides of the cis dicarboxylic acids. Suitable examples include maleic acid, maleic anhydride, itaconic acid, mesaconic acid, fumaric acid, and citraconic acid. Maleic anhydride and itaconic acid are preferred monoethylenically unsaturated dicarboxylic acid monomers.

The acid monomers useful in this invention may be in their acid forms or in the form of the alkali metal or ammonium salts of the acid. Suitable bases useful for neutralizing the monomer acids include sodium hydroxide, ammonium hydroxide, potassium hydroxide, and the like. The acid monomers may be neutralized to a level of from 0 to 50 percent and preferably from 0 to about 20 percent for polymerization or derivativation reactions conducted in, for example, aqueous media. More preferably, the carboxylic acid monomers are used in the completely neutralized form. Partial neutralization of the carboxylic acid monomers minimizes or eliminates corrosion on parts of the reaction equipment, but conversion of the monomers into polymer product may, in some instances, be diminished. The monomers may be neutralized prior to or during polymerization. The polymer products are often particularly useful in their partially or completely neutralized form.

In addition, up to 50 percent by weight of the total polymerizable monomers may be monoethylenically unsaturated carboxylic acid-free monomers. Suitable monoethylenically unsaturated carboxylic acid-free monomers in embodiments, should preferably be copolymerizable with the carboxylic monomers. Typical monoethylenically unsaturated carboxylic acid-free monomers which are suitable for this invention include alkyl esters of acrylic or such as methyl acrylate, ethyl acrylate, butyl acrylate; hydroxyalkyl esters of acrylic or such as hydroxyethyl acrylate, hydroxypropyl acrylate, and; acrylamide, dimethylaminoethyl acrylate, vinyl acetate, styrene, hydroxylated styrenes, styrenesulfonic acid and salts thereof, vinylsulfonic acid and salts thereof, and and salts thereof.

Monomers, polymers and copolymers of the present invention can, in embodiments be separated from one another or from the polymerization reaction mixture by, for example, changing the pH of the reaction media and other well known conventional separation techniques.

Suitable initiators for the processes of the present invention are any conventional free radical initiators which have a half-life of at least 1 second at the polymerization temperature. Preferably, the initiator will have a half life of from about 10 second to about 2 hours, more preferably from about 10 seconds to about 10 minutes at the reaction temperature. These initiators include, but are not limited to oxygen, hydrogen peroxide, certain alkyl hydroperoxides, dialkyl peroxides, cyclic peroxides, peroxy ketals, peresters, percarbonates, peroxides, persulfates and azo initiators. Specific examples of some suitable initiators include hydrogen peroxide, t-butyl hydroperoxide, di-tertiary butyl peroxide, tertiary-amyl hydroperoxide, potassium persulfate, and methylethyl ketone peroxide. The initiators are normally used in amounts of from about 0.05 percent to about 16 percent based on the weight of total polymerizable monomer. A preferred range is from about 0.5 to about 10 percent by weight of the total polymerizable monomer.

Water-soluble redox initiators may, in embodiments, also be used. These initiators include, but are not limited to, sodium bisulfite, sodium sulfite, isoascorbic acid, sodium formaldehyde-sulfoxylate, and the like, used with suitable oxidizing agents, such as the thermal initiators noted above. If used, the redox initiators may be used in amounts of 0.05 percent to 16 percent, based on the weight of total monomer. A preferred range is from about 0.5 to about 5 percent by weight of total monomer. Many of these initiators introduce salt by-products into the aqueous polymer product. It is preferred that the level of these initiators, if used, be minimized.

Various stable free radical compounds are known including hydrophilic stable free radical compounds, for example, U.S. Pat. No. 5,264,204, discloses a magnetic resonance organ and tissue imaging method using hydrophilic stable free radical compounds. A number of other suitable stable free radical compounds are available commercially and are readily accessible synthetically, for example, as disclosed in "Synthetic Chemistry of Stable Nitroxides", by L. B. Volodarsky et al., CRC Press, 1993, ISBN:0-8493-4590-1.

The monomers are polymerized by heating in a reactor suitable for withstanding elevated temperatures and pressures, and accommodating reaction media selected from the group consisting of solution, bulk, suspension, emulsion, phase transfer, and extrusion. An aqueous reaction mixture may contain from about 1 to about 99 percent by weight monomer, preferably from about 20 to about 90 percent by weight monomer, when the preparative process is accomplished non-aqueous monomers are perferably selected. The balance of the reaction mixture comprises free radical initiator, stable free radical agent, optionally solvent and promoter compounds.

The polymerization reactions can be supplemented with a water miscible or hydrophilic cosolvent to help ensure that the reaction mixture remains a homogeneous single phase throughout the monomer conversion for hydrophilic monomer polymerizations. Any solvent or cosolvent may be selected so long as reaction media is effective in providing a solvent system which avoids precipitation or phase separation of the reactants or polymer products until after all polymerization reactions have been completed. Exemplary solvents and cosolvents useful in the present invention may be selected, for example, from the group consisting of aliphatic alcohols, glycols, ethers, glycol ethers, pyrrolidines, N-alkyl pyrrolidinones, N-alkyl pyrrolidones, polyethylene glycols, polypropylene glycols, amides, carboxylic acids and salts thereof, esters, organosulfides, sulfoxides, sulfones, alcohol derivatives, hydroxyether derivatives such as butyl CARBITOL® or CELLOSOLVE®, amino alcohols, ketones, and the like, derivatives thereof, and mixtures thereof. Specific examples include methanol, ethanol, propanol, dioxane, ethylene glycol, propylene glycol, diethylene glycol, glycerine, dipropylene glycol, tetrahydrofuran, and mixtures thereof. When mixtures of water and water soluble or miscible organic liquids are selected as the reaction media, the water to cosolvent weight ratio typically ranges from about 100:0 to about 10:90, and preferably from about 97:3 to about 25:75.

Temperature of the polymerization may range from about 100° C. to about 180° C., preferably from about 110° C. to about 175° C. At temperatures below about 100° C., the reaction rate is slow and industrially impractical without the aid of an acid or base accelerating additive compound. At temperatures above about 180° C., conversion of the monomer into polymer decreases and uncertain and undesirable by-products are formed. Frequently, these by-products discolor the polymer mixture and may necessitate a purification step to remove them or they may be intractable.

Since volatile solvent and cosolvent admixtures can be used as the reaction solvent, the elevated temperatures of the polymerization require that the polymerization reactor be equipped to operate at elevated pressure. In general, it is preferred to conduct the polymerization at from about 10 to about 2,000 pounds per square inch (psi), and more preferably at from about 50 to about 1,000 psi.

The molecular weights referred to are measured by gel permeation chromatography using, for example, polystyrene standard unless specifically stated otherwise.

Although not being desired to be limited by theory, it is believed that when the polymerization reaction processes of the present invention are performed at a temperature at about or above 100° C., the exact temperature depending on the initiator used, all the polymer chains are expected to be initiated at about the same time. This is believed to be an important feature in forming polymeric chain products having narrow polydispersities.

The aforementioned undesirable chain coupling or disproportionation termination reactions, so prevalent under the conditions of the prior art free radical polymerization systems, is suppressed under the conditions of the present invention because the effective instantaneous concentration and availability of living free chains is extremely small. In addition, stable free radical agents of the present invention do not initiate polymerization so that new chains are not initiated after an initial period during which all polymer chains are initiated at about the same time.

Propagating chains of the present invention are referred to as pseudoliving because the stable free radical agent adds to a propagating chain and the chain is temporarily, but reversibly, terminated or protected, reference the aforementioned U.S. Pat. No. 5,332,912 The term "protected" as used herein refers, for example, to the availability of propagating chain radical species for selective rather than indiscriminant further reaction with monomer. An unmoderated free radical polymerization chain, that is, a free radical polymerization process without a stable free radical agent present, in contrast, has a reactive or "open" chain end throughout its lifetime which is typically irreversibly terminated on the order of seconds.

The present invention provides several specific advantages in embodiments as follows.

With the process of the present invention, polymer product polydispersities can be varied from between approximately 1.0 to approximately 2.0 or higher if desired depending on the monomer/comonomer system by varying the ratio of stable free radical agent to free radical initiator molar concentration. When the polymerization process conditions of the present invention are attempted without using the a stable free radical (SFR) additive, broad molecular weight resins are obtained, typically 2 or greater.

During the reaction of monomer or mixed monomers to form polymers, the reaction time may be varied over about 1 to 60 hours, preferably between about 2 to 10 hours and optimally about 3 to 7 hours. The optimal reaction time may vary depending upon the temperature, the volume and scale of the reaction, and the quantity and type of polymerization initiator and stable free radical agent selected.

The polymerization reaction temperature is kept relatively constant throughout the heating step by providing an adjustable external heat source and the temperature is from about 60° C. to about 180° C., and preferably between 100° C. and 160° C. and optimally in embodiments about 120° C. to 150° C. Reactions performed above 200° C. tend to result in a broadening of the polydispersity. A reaction volume may be selected for any size that enables simple adding, mixing, reacting and isolating the product resins on an economic or convenient scale.

The free radical initiator can be any free radical polymerization initiator capable of initiating a free radical polymerization process of unsaturated monomers and includes peroxide initiators such as benzoyl peroxide, persulfate initiators such as potassium persulfate, azo initiators such as azobisisobutyronitrile, and the like are used with a bifunctional olefin, such as divinyl benzene. Alternatively, in embodiments, bifunctional free radical initiator compounds may be used, such as the aformentioned LUPERSOL 2531. The free radical initiator concentration employed is about 0.2 to about 16.0 weight percent of the total weight of monomer to be polymerized and is determined by the desired molecular weight of the resin. As the initiator concentration is decreased relative to the weight or molar equivalents of monomer used, the molecular weight or the thermoplastic resin product typically increases. Other suitable bifunctional free radicals or sources of diradical compounds are disclosed in the art, reference for example, U.S. Pat. Nos. 4,228,232 and 5,032,486, including photosensitive and photoinitiated systems disclosed therein.

The monomer or monomers to be polymerized may be dissolved in water or aqueous mixtures of polar protic or aprotic organic solvents. The resultant aqueous solution usually contains a suitable water-soluble, free-radical generating initiator such as a peroxide or a persulfate, and the like, as defined above. The monomer or monomers are used in effective amounts relative to the free radical initiator, and stable free radical agent, as defined hereinafter.

The stable free radical agent can be any stable free radical and includes nitroxide free radicals, for example, PROXYL (2,2 5,5-tetramethyl-1-pyrrolidinyloxy) and derivatives thereof, DOXYL (4,4-dimethyl-3-oxazolinyloxy) and derivatives thereof, and TEMPO (2,2,6,6-tetramethyl-1-piperidinyloxy) and derivatives thereof, and the like. These stable free radical agent materials are well known in the literature, for example, G. Moad et.al., *Tetrahedron Letters*, 22, 1165 (1981) as free radical polymerization inhibitors. Other suitable nitroxides are di-tert-butyl nitroxide and related di-tertiary alkyl substituted nitroxides. However, under the polymerization conditions of the present invention, the stable free radical agents function not as inhibitors but as moderators to harness the normally highly reactive and indiscriminate propagating intermediate free radical species. The stable free radical agents are preferably soluble in the monomer phase or monomer-solvent phase where predominantly all the polymerization of monomers occurs. Stable free radical agents which have limited monomer solubility are still useful, but may require a monomer miscible cosolvent or else the stable free radical compounds result in less predictable polymerization processes. If the stable free radical agent separates out of the monomer phase to any great extent then the balance desired between the mole ratio of the stable free radical agent, free radical initiator, and propagating free radical polymer chain species may be upset.

The molar ratio of the stable free radical (SFR) agent to free radical initiator (INIT) is from about 0.5 to 5.0, and preferably in the range from about 0.4 to 4.0. Although not wanting to be limited by theory, in an embodiment, the molar ratio [SFR:INIT.] of stable free radical agent, for example, TEMPO, to free radical initiator, for example, LUPERSOL 2531 is about 2.0 and is believed to be important for success of the process. If the [SFR:INIT.] is too high, then the reaction rate is noticeably inhibited. If the [SFR:INIT.] is too low, then the reaction product has undesired increased polydispersity. It should be noted that when water soluble styrene compounds are polymerized to polystyrene derivatives without the stable free radical agent of the present process, the product polymers isolated have polydispersities of 2.0 and above.

In embodiments, the molar ratio of monomer content to stable free radical agent to free radical initiator is from about 6.0:0.2:1 to about 10,000:2.5:1 and preferably in the range of about 125:2.0:1 to about 7,000:1.3:1.

Processes of the present invention, in embodiments, provide for selective low, intermediate, and high monomer to polymer conversion rates, or degrees of polymerization, and preferably, for example, of 90 percent by weight or greater.

The low weight average molecular weight resin products having narrow polydispersity properties, as is also the situation with intermediate and high molecular weight products of the present invention, may be obtained without the use of a chain transfer agent.

Processes of the present invention, in embodiments provide for relatively high weight average molecular weight polymeric products, from weight average molecular weights ranging in size of from about 2,000 to about 200,000 while delivering narrow polydispersity products.

The monomers that can be used are any monomer capable of undergoing a free radical polymerization and include but are not limited to styrene, substituted styrenes and derivatives thereof, for example, hydroxylated and methylated styrenes, acrylates, methacrylates, butadiene and any conjugated diene monomer sufficiently reactive under the specified stable free radical moderated polymerization reaction conditions to afford a stable free radical reaction adduct and subsequently high molecular weight polymer products, for example, polymers of isoprene and myrcene.

The polymerization reaction rate of the monomers may, in embodiments, be accelerated and the reaction time reduced to from about 3 to about 7 hours from greater than 16 hours by the addition of a minor amount of a protic acid selected from the group consisting of inorganic acids, such as sulfuric, hydrochloric, and the like, and organic sulfonic and carboxylic acids, where camphorsulfonic acid is a preferred organic sulfonic acid and where the molar ratio of stable free radical to added acid is from about 1:1 to 11:1, with a preferred ratio of between about 1.5:1 and 5:1. Excessive addition of inorganic and organic acid beyond the aforementioned amounts causes the resin polydispersity to broaden.

By cooling the polymerization reaction to below 60 to 80° C., the stable free radical moderated polymerization process is effectively quenched or terminated. Each new or subsequent addition of mixtures containing monomer, stable free radical and initiator accompanied by heating provides a new polymeric species having a narrow molecular weight distribution and each new polymer species continues to grow independently of the other polymer species already established thereby providing the capability of forming well defined, narrow polydispersity, bimodal and multimodal polymer mixtures.

Alternatively, block copolymer resins may also be prepared whereby after each desired block has been formed a new monomer or monomers is added, without the addition of more initiator or stable free radical agent, to form a new block at each end of the polymer chain wherein each block component is well defined in length and has a narrow molecular weight distribution and having properties depending on the repeated sequence and the monomers chosen for incorporation. Monomers added subsequent to the formation of the first formed blocks may be water soluble or water insoluble. Thus, careful selection of the water solubility properties of added monomers and of the resulting polymeric segments enables convenient synthetic routes to block, triblock, and multiblock copolymers with narrow polydispersities that are useful, for example, as surfactants, viscosity index modifiers, dispersants, and emulsifiers.

The polymeric products of the present invention may be optionally crosslinked with, for example, known crosslinking, coupling, or curing agents such as divinyl benzene and the like, either in situ or in a separate post polymerization process step.

The polymeric products of the present invention may be used as polymer crosslinking agents or compounds by heating a bifunctional resin with free radical reactive polymers, for example, containing unsaturations or double bonds, to form crosslinked resins wherein the bifunctional resin is the crosslinking molecule.

The bifunctional resin of the present invention, particularly the triblock and multiblock copolymer resins, are also useful as resin compatibilizing compounds for forming, for example, compatible blends of dissimilar polymers.

Additional optional known additives may be used in the polymerization reactions which do not interfere with the objects of the invention and which may provide additional performance enhancements to the resulting product, for example, colorants, lubricants, release or transfer agents, surfactants, stabilizers, antifoams, antioxidants, and the like.

Polymer resins possessing a discrete mixture of monomodal, that is a well defined multimodal molecular weight distribution may in embodiments thereof provide several advantages, particularly for electrophotographic toner compositions such as: melt rheology properties including improved flow and elasticity; and improved performance properties such as triboelectrification, admix rates, and shelf life stabilities.

In the aforementioned U.S. Pat. No. 5,332,912 there is disclosed a monomer polymerized in bulk or in the absence of a solvent or diluent, that is neat, using a mixture of styrene monomer, a free radical initiator, and a stable free radical agent at constant temperature. A plot of weight percent monomer conversion versus number average molecular weight indicates that a nearly linear relationship holds for bulk polymerization reaction media using stable free radical agent moderated processes and which relationship is believed to be operative in the present invention. Thus, the Trommsdorff effect, that is, known exothermic heating or autoacceleration of the monomer conversion reaction rate and randomization of molecular weights observed in unmoderated free radical polymerization reactions is effectively suppressed in polymerization processes of the present invention even at high solids content, high conversion, and elevated temperature free radical initiated polymerization reactions.

Toner compositions can be prepared by a number of known methods, such as admixing and heating resin particles obtained with the processes of the present invention such as styrene butadiene copolymer derivatives, pigment particles such as magnetite, carbon black, or mixtures thereof, and cyan, yellow, magenta, green, brown, red, or mixtures thereof, and preferably from about 0.5 percent to about 5 percent of charge enhancing additives in a toner extrusion device, such as the ZSK53 available from Werner Pfleiderer, and removing the formed toner composition from the device. Subsequent to cooling, the toner composition is subjected to grinding utilizing, for example, a Sturtevant micronizer for the purpose of achieving toner particles with a volume median diameter of less than about 25 microns, and preferably of from about 6 to about 12 microns, which diameters are determined by a Coulter Counter. Subsequently, the toner compositions can be classified utilizing, for example, a Donaldson Model B classifier for the purpose of removing toner fines, that is toner particles less than about 4 microns volume median diameter.

Illustrative examples of suitable toner polymer resins selected for the toner and developer compositions prepared in embodiments of the present invention include styrene acrylates, styrene methacrylates, styrene butadienes, vinyl resins, including homopolymers and copolymers of two or more vinyl monomers; vinyl monomers include styrene, p-chlorostyrene, butadiene, isoprene, and myrcene; vinyl esters like esters of monocarboxylic acids including methyl acrylate, ethyl acrylate, n-butyl acrylate, isobutyl acrylate, dodecyl acrylate, n-octyl acrylate, phenyl acrylate, acrylamide; and the like. Preferred toner resins include styrene butadiene copolymers, polyesters, polyamides, mixtures thereof, and the like. Other preferred toner resins include styrene/acrylate copolymers, PLIOLITES®; suspension polymerized styrene butadienes, reference U.S. Pat. No. 4,558,108, the disclosure of which is totally incorporated herein by reference. The telechelic polymers prepared in embodiments of the present invention can be used alone or in combination with, for example, physically blended with or covalently compounded with, the aforementioned homopolymers and copolymers.

In toner compositions, the resin particles are present in a sufficient but effective amount, for example from about 70 to about 90 weight percent. Thus, when 1 percent by weight of the charge enhancing additive is present, and 10 percent by weight of pigment or colorant, such as carbon black, is contained therein, about 89 percent by weight of resin is selected. Also, the charge enhancing additive may be coated on the pigment particle. When used as a coating, the charge enhancing additive is present in an amount of from about 0.1 weight percent to about 5 weight percent, and preferably from about 0.3 weight percent to about 1 weight percent.

Numerous well known suitable pigments or dyes can be selected as the colorant for the toner particles including, for example, carbon black like REGAL 330®, nigrosine dye, aniline blue, magnetite, or mixtures thereof. The pigment, which is preferably carbon black, should be present in a sufficient amount to render the toner composition highly colored. Generally, the pigment particles are present in amounts of from about 1 percent by weight to about 20 percent by weight, and preferably from about 2 to about 10 weight percent based on the total weight of the toner composition; however, lesser or greater amounts of pigment particles can be selected.

When the pigment particles are comprised of magnetites, thereby enabling single component toners in some instances, which magnetites are a mixture of iron oxides ($FeO.Fe_2O_3$) including those commercially available as Mapico Black, they are present in the toner composition in an amount of from about 10 percent by weight to about 70 percent by weight, and preferably in an amount of from about 10 percent by weight to about 50 percent by weight. Mixtures of carbon black and magnetite with from about 1 to about 15 weight percent of carbon black, and preferably from about 2 to about 6 weight percent of carbon black, and magnetite, such as MAPICO BLACK®, in an amount of, for example, from about 5 to about 60, and preferably from about 10 to about 50 weight percent can be selected.

There can also be blended with the toner compositions of the present invention external additive particles including flow aid additives, which additives are usually present on the surface thereof. Examples of these additives include colloidal silicas, such as AEROSIL®, metal salts and metal salts of fatty acids inclusive of zinc stearate, aluminum oxides, cerium oxides, and mixtures thereof, which additives are generally present in an amount of from about 0.1 percent by weight to about 5 percent by weight, and preferably in an amount of from about 0.1 percent by weight to about 1 percent by weight. Several of the aforementioned additives are illustrated in U.S. Pat. Nos. 3,590,000 and 3,800,588.

With further respect to the present invention, colloidal silicas, such as AEROSIL®, can be surface treated with the charge additives in an amount of from about 1 to about 30 weight percent and preferably 10 weight percent followed by the addition thereof to the toner in an amount of from 0.1 to 10 and preferably 0.1 to 1 weight percent.

Also, there can be included in the toner compositions low molecular weight waxes, such as polypropylenes and polyethylenes commercially available from Allied Chemical and Petrolite Corporation, EPOLENE N-15® commercially available from Eastman Chemical Products, Inc., VISCOL 550-P®, a low weight average molecular weight polypropylene available from Sanyo Kasei K.K., and similar materials. The commercially available polyethylenes selected have a molecular weight of from about 1,000 to about 1,500, while the commercially available polypropylenes utilized for the toner compositions are believed to have a molecular weight of from about 4,000 to about 5,000. Many of the polyethylene and polypropylene compositions useful in the present invention are illustrated in British Patent No. 1,442,835.

The low molecular weight wax materials are optionally present in the toner composition or the polymer resin beads of the present invention in various amounts, however, generally these waxes are present in the toner composition in an amount of from about 1 percent by weight to about 15 percent by weight, and preferably in an amount of from about 2 percent by weight to about 10 percent by weight and may in embodiments function as fuser roll release agents.

Encompassed within the scope of the present invention are colored toner and developer compositions comprised of toner resin particles, carrier particles, the charge enhancing additives illustrated herein, and as pigments or colorants red, blue, green, brown, magenta, cyan and/or yellow particles, as well as mixtures thereof. More specifically, with regard to the generation of color images utilizing a developer composition with charge enhancing additives, illustrative examples of magenta materials that may be selected as pigments include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyan materials that may be used as pigments include copper tetra-4-(octadecyl sulfonamido) phthalocyanine, X-copper phthalocyanine pigment listed in the Color Index as CI 74160, CI Pigment Blue, and Anthrathrene Blue, identified in the Color Index as CI 69810, Special Blue X-2137, and the like; while illustrative examples of yellow pigments that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, and Permanent Yellow FGL. The aforementioned pigments are incorporated into the toner composition in various suitable effective amounts providing the objectives of the present invention are achieved. In one embodiment, these colored pigment particles are present in the toner composition in an amount of from about 2 percent by weight to about 15 percent by weight calculated on the weight of the toner resin particles.

For the formulation of developer compositions, there are mixed with the toner particles carrier components, particularly those that are capable of triboelectrically assuming an opposite polarity to that of the toner composition. Accordingly, the carrier particles are selected to be of a negative polarity enabling the toner particles, which are positively charged, to adhere to and surround the carrier particles. Illustrative examples of carrier particles include iron powder, steel, nickel, iron, ferrites, including copper zinc ferrites, and the like. Additionally, there can be selected as carrier particles nickel berry carriers as illustrated in U.S. Pat. No. 3,847,604, the disclosure of which is totally incorporated herein by reference. The selected carrier particles can be used with or without a coating, the coating generally containing terpolymers of styrene, methylmethacrylate, and a silane, such as triethoxy silane, reference U.S. Pat. No. 3,526,533, U.S. Pat. No. 4,937,166, and U.S. Pat. No. 4,935,326, the disclosures of which are totally incorporated herein by reference, including for example KYNAR® and polymethylmethacrylate mixtures (40/60). Coating weights can vary as indicated herein; generally, however, from about 0.3 to about 2, and preferably from about 0.5 to about 1.5 weight percent coating weight is selected.

Furthermore, the diameter of the carrier particles, preferably spherical in shape, is generally from about 50 microns to about 1,000 microns, and in embodiments about 175 microns thereby permitting them to possess sufficient density and inertia to avoid adherence to the electrostatic images during the development process. The carrier component can be mixed with the toner composition in various suitable combinations, however, best results are obtained when about 1 to 5 parts per toner to about 10 parts to about 200 parts by weight of carrier are selected.

The toner composition of the present invention can be prepared by a number of known methods as indicated herein including extrusion melt blending the toner resin particles, pigment particles or colorants, and a charge enhancing additive, followed by mechanical attrition. Other methods include those well known in the art such as spray drying, melt dispersion, emulsion aggregation, and extrusion processing. Also, as indicated herein the toner composition without the charge enhancing additive in the bulk toner can be prepared, followed by the addition of charge additive surface treated colloidal silicas.

The toner and developer compositions may be selected for use in electrostatographic imaging apparatuses containing therein conventional photoreceptors providing that they are capable of being charged positively or negatively. Thus, the toner and developer compositions can be used with layered photoreceptors that are capable of being charged negatively, such as those described in U.S. Pat. No. 4,265,990, the disclosure of which is totally incorporated herein by reference. Illustrative examples of inorganic photoreceptors that may be selected for imaging and printing processes include selenium; selenium alloys, such as selenium arsenic, selenium tellurium and the like; halogen doped selenium substances; and halogen doped selenium alloys.

The toner compositions are usually jetted and classified subsequent to preparation to enable toner particles with a preferred average diameter of from about 5 to about 25 microns, and more preferably from about 8 to about 12 microns. Also, the toner compositions preferably possess a triboelectric charge of from about 0.1 to about 2 femtocoulombs per micron as determined by the known charge spectrograph. Admix time for toners are preferably from about 5 seconds to 1 minute, and more specifically from about 5 to about 15 seconds as determined by the known charge spectrograph. These toner compositions with rapid admix characteristics enable, for example, the development of images in electrophotographic imaging apparatuses, which images have substantially no background deposits thereon, even at high toner dispensing rates in some instances, for instance exceeding 20 grams per minute; and further, such toner compositions can be selected for high speed electrophotographic apparatuses, that is those exceeding 70 copies per minute.

Also, the toner compositions prepared from resins of the present invention possess desirable narrow charge distributions, optimal charging triboelectric values, preferably of from 10 to about 40, and more preferably from about 10 to about 35 microcoulombs per gram as determined by the known Faraday Cage methods with from about 0.1 to about 5 weight percent in one embodiment of the charge enhancing additive; and rapid admix charging times as determined in the charge spectrograph of less than 15 seconds, and more preferably in some embodiments from about 1 to about 14 seconds.

The following Examples are being supplied to further define various species of the present invention, it being noted that these Examples are intended to illustrate and not limit the scope of the present invention. Parts and percentages are by weight unless otherwise indicated.

EXAMPLE I

A solution of styrene (22 mL) and TEMPO (0.40 g) was heated in an oil bath maintained at a temperature of 140° C., under argon. A solution of LUPERSOL 2531 (0.05 g) in styrene (5.5 g) was added all at once and the reaction was allowed to proceed for 8 hours. The reaction mixture was precipitated in methanol (1.0 liter) and filtered. The molecular weight of the resulting poystyrene, as determined by GPC, was $M_n$=11,200, $M_w$=13,700 with polydispersity of about 1.2.

EXAMPLE II

When Example I was repeated with a larger amount of initiator, lower molecular weight resins were obtained. A solution of styrene (90 mL) and TEMPO (3.2 g) was heated in an oil bath maintained at 140° C., under argon. A solution of LUPERSOL 2531 (4.0 g) in styrene (20 g) was added all at once and the reaction was allowed to proceed for 6 hours. The reaction mixture was precipitated in methanol (4.0 liters) and filtered. The molecular weight of the resulting poystyrene, as determined by GPC, was $M_n$=2,250, $M_w$=2,770 with polydispersity equal to 1.23.

EXAMPLE III

When Example I is repeated with smaller amounts of initiator, higher molecular weight resins can be obtained. A solution of styrene (90 mL) and TEMPO (0.4 g) is heated in an oil bath maintained at 140° C., under argon. A solution of LUPERSOL 2531 (0.5 g) in styrene (20 g) is added all at once and the reaction is allowed to proceed for 6 hours. The reaction mixture is precipitated in methanol (4.0 liters) and filtered.

EXAMPLE IV

Magnetic Toner Preparation and Evaluation

The polymer resin (74 weight percent of the total mixture) obtained by the stable free radical polymerization processes in Example I may be melt extruded with 10 weight percent of REGAL 330® carbon black and 16 weight percent of MAPICO BLACKS magnetite at 120° C., and the extrudate pulverized in a Waring blender and jetted to 8 micron number average sized particles. A positively charging magnetic toner may be prepared by surface treating the jetted toner (2 grams) with 0.12 gram of a 1:1 weight ratio of AEROSIL R972® (Degussa) and TP-302 a naphthalene sulfonate and quaternary ammonium salt (Nachem/Hodogaya SI) charge control agent.

Developer compositions may then be prepared by admixing 3.34 parts by weight of the aforementioned toner composition with 96.66 parts by weight of a carrier comprised of a steel core with a polymer mixture thereover containing 70 percent by weight of KYNAR®, a polyvinylidene fluoride, and 30 percent by weight of polymethyl methacrylate; the coating weight being about 0.9 percent. Cascade development may be used to develop a Xerox Model D photoreceptor using a "negative" target. The light exposure may be set between 5 and 10 seconds and a negative bias used to dark transfer the positive toned images from the photoreceptor to paper.

Fusing evaluations may be carried out with a Xerox Corporation 5028® soft silicone roll fuser, operated at 7.62 cm (3 inches) per second.

The minimum fix and hot offset temperatures of stable free radical polymerization polymers having narrow polydispersities as toners are expected to be improved over toners prepared from resins synthesized by a free radical polymerization process without a stable free radical agent present affording broad polydispersities. The actual fuser roll temperatures may be determined using an Omega pyrometer and was checked with wax paper indicators. The degree to which a developed toner image adhered to paper after fusing is evaluated using a Scotch® tape test. The fix level is expected to be excellent and comparable to that fix obtained with toner compositions prepared from other methods for preparing toners having resins with high molecular weights and narrow polydispersities. Typically greater than 95 percent of the toner image remains fixed to the copy sheet after removing a tape strip as determined by a densitometer.

Images may be developed in a xerographic imaging test fixture with a negatively charged layered imaging member comprised of a supporting substrate of aluminum, a photogenerating layer of trigonal selenium, and a charge transport layer of the aryl amine N,N'-diphenyl-N,N'-bis(3-methylphenyl)1,1'-biphenyl-4,4'-diamine, 45 weight percent, dispersed in 55 weight percent of the polycarbonate MAKROLON®, reference U.S. Pat. No. 4,265,99; images for toner compositions prepared from the copolymers derived from for example, Example III are expected to be of excellent quality with no background deposits and of high resolution over an extended number of imaging cycles exceeding, it is believed, about 75,000 imaging cycles.

Other toner compositions may be readily prepared by conventional means from the polymer and copolymer resins of the present invention including colored toners, single component toners, multi-component toners, toners containing special performance additives, and the like.

The aforementioned stable free radical agent moderated polymerization process may be applied to a wide range of organic monomers to provide novel toner resin materials with desirable electrophotographic properties. For example, the block, triblock and multiblock copolymers have application as dispersants for photoreceptor pigments. The bifunctional polymers and derivatives thereof have application to low melt resins. Narrow molecular weight bifunctional block, triblock and multiblock resins find application as improved toner resins and resin compatibilization for general application.

The above mentioned patents and publications are incorporated by reference herein in their entirety.

Other modifications of the present invention may occur to those skilled in the art based upon a review of the present application and these modifications, including equivalents thereof, are intended to be included within the scope of the present invention.

What is claimed is:

1. A polymerization process for the preparation of a polymer with covalently bound stable free radical groups at ends of the polymer, comprising the steps of:

heating a mixture comprised of:
(i) an initiator selected from the group consisting of benzoyl peroxide and azobisisobutyronitrile,
(ii) a stable free radical selected from the group consisting of 2,2,5,5-tetraalkyl-1-pyrrolidinyloxy and derivatives thereof, 2,2,6,6-tetraalkyl-1-piperidinyloxy and derivatives thereof, 4,4-dialkyl-3-oxazolinyloxy and derivatives thereof, and di-tertiary alkyl substituted nitroxides, and
(iii) a bifunctional free radical reactive compound selected from the group consisting of divinyl benzene, diisopropenyl benzene, 1,4-pentadiene, N,N'-methylenebisacrylamide, ethylene glycol dimethacrylate, diethylene glycol dimethacrylate, triethylene glycol dimethacrylate, polyethylene glycol dimethacrylate, divinyl ether, bisphenol A dimethacrylate, and bisoxyethylenated bisphenol A diacrylate, to form an intermediate bifunctional free radical adduct compound represented by SFR-I-B-I-SFR, wherein SFR is a residue of said stable free radical, I is a residue of said initiator, and B is a residue of said bifunctional free radical reactive compound;

adding polymerizable monomers selected from the group consisting of acrylates and methacrylates to the intermediate bifunctional free radical adduct compound to form a mixture; and heating the mixture at a temperature of from about 70 to about 180° C. to polymerize the monomers to form a bifunctional thermoplastic resin of the formula SFR-$R_1$-I-B-I-$R_2$-SFR wherein $R_1$ and $R_2$ are polymerized forms of said monomers, said thermoplastic resin having a polydispersity of from about 1.25 to about 1.70.

2. The process of claim 1, wherein said initiator is benzoyl peroxide, said stable free radical is 2,2,6,6-tetramethyl-1-piperidinyloxy, said bifunctional free radical reactive compound is divinyl benzene, and said monomer is at least one member selected from the group consisting of acrylic acid and methacrylic acid.

* * * * *